US007844808B2

(12) United States Patent
Westerinen et al.

(10) Patent No.: US 7,844,808 B2
(45) Date of Patent: Nov. 30, 2010

(54) COMPUTER COMPLIANCE ENFORCEMENT

(75) Inventors: William J. Westerinen, Sammamish, WA (US); Todd L. Carpenter, Monroe, WA (US); Alexander Frank, Bellevue, WA (US); Shon Schmidt, Seattle, WA (US); Stephen Richard Drake, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 811 days.

(21) Appl. No.: 11/612,435

(22) Filed: Dec. 18, 2006

(65) Prior Publication Data

US 2008/0148036 A1    Jun. 19, 2008

(51) Int. Cl.
*H04K 1/00*    (2006.01)
*G06F 21/22*   (2006.01)

(52) U.S. Cl. ............................ 713/1; 713/100; 713/300; 705/50; 705/51; 705/52

(58) Field of Classification Search ................ 713/1, 713/100, 300; 705/50–52
See application file for complete search history.

(56) References Cited

U.S. PATENT DOCUMENTS

| 6,618,810 | B1 | 9/2003 | Dirie |
| 6,671,813 | B2 | 12/2003 | Ananda |
| 7,003,607 | B1 | 2/2006 | Gulick |
| 7,096,305 | B2 | 8/2006 | Moll |
| 7,103,703 | B1 | 9/2006 | Reeves et al. |
| 7,392,390 | B2 * | 6/2008 | Newcombe ............... 713/170 |
| 7,437,198 | B2 * | 10/2008 | Iwaki ...................... 700/17 |
| 7,539,647 | B2 * | 5/2009 | Xu et al. .................. 705/52 |
| 2003/0135380 | A1 * | 7/2003 | Lehr et al. ................ 705/1 |
| 2005/0289072 | A1 | 12/2005 | Sabharwal |
| 2006/0129732 | A1 | 6/2006 | Tsai et al. |
| 2008/0104381 | A1 * | 5/2008 | Peacock et al. ............ 713/1 |
| 2008/0104701 | A1 * | 5/2008 | Peacock et al. ........... 726/22 |
| 2008/0184283 | A1 * | 7/2008 | Maislen et al. ............ 725/1 |

FOREIGN PATENT DOCUMENTS

WO    WO-9725675    7/1997

OTHER PUBLICATIONS

Office Action Summary; U.S. Appl. No. 11/515,410; Application Date: Aug. 31, 2006; First Named Inventor: Alexander Frank; Mailing Date: Apr. 29, 2009; pp. 34.

(Continued)

*Primary Examiner*—Abdelmoniem Elamin
(74) *Attorney, Agent, or Firm*—Marshall, Gerstein & Borun LLP (57) ABSTRACT

A security module for a pay-per-use computer supplies an appropriate BIOS for a given mode of operation. A power manager in the security module powers only essential circuits until the BIOS is operational to help prevent substitution of a non-authorized BIOS. The security module also includes a capability to monitor and restrict data lines on a bus between a main computer processor and computer system memory. When the computer is operating in a restricted use mode, data lines may be restricted to allow only minimal access to the computer system memory. Bus transactions may be monitored to ensure that only valid transactions are occurring and are within the designated memory space.

18 Claims, 4 Drawing Sheets

OTHER PUBLICATIONS

"HyperTransport Consortium Maintains Interconnect Performance Leadership with New 3.0 Specification," http://www.hypertransport.org/news/pr/HyperTransport_30_Press_Release.pdf#search=%22hypertraNSPORT%2bPDF%22.

"HyperTransportm™ Technology I/O Link," Advanced Micro Devices, Inc., 2001, http://www.amd.com/us-en/assets/content_type/white_papers_and_tech_docs/HyperTransport_IO_Link_Link_Whitepaper_25012A.pdf#search=%22hypertransport%2Bdf%22.

Ferreira, et al., "Two Approaches for Pay-per-Use Software Construction," IEEE, 2000, http://ieeexplore.ieee.org/iel5/6886/18539/00853874.pdf?isNumber=.

\* cited by examiner

COMPUTER COMPLIANCE ENFORCEMENT

BACKGROUND

Pay-as-you-go or pay-per-use business models have been used in many areas of commerce, from cellular telephones to commercial laundromats. In developing a pay-as-you go business, a provider, for example, a cellular telephone provider, offers the use of hardware (a cellular telephone) at a lower-than-market cost in exchange for a commitment to remain a subscriber to their network for a period of time. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is predicated on the concept that the hardware provided has little or no value, or use, if disconnected from the service provider. To illustrate, should the subscriber mentioned above cease to pay his or her bill, the service provider deactivates the account, and while the cellular telephone may power up, calls cannot be made because the service provider will not allow them. The deactivated phone has no "salvage" value, because the phone will not work elsewhere and the component parts are not easily salvaged nor do they have a significant street value. In most cases, however, even though the phone has been deactivated it is still capable of connecting to the service provider in order to arrange restoration of the account. When the account is brought current, the service provider will re-authorize the device on its network and allow calling.

This model works well when the service provider, or other entity taking the financial risk of providing subsidized hardware, is able to enforce the terms of the contract as above, that is, by limiting use of the device to only those functions required to restore the account. When the device is more complex, such as a computer, merely limiting access to a network may not be sufficient to force a subscriber to comply with terms of a contract.

SUMMARY

The simplest, and possibly most effective, form of enforcement when a subscription or pay-per-use computer user fails to meet contractual obligations is to just disable or shut off the computer. However, such a measure may be difficult to recover from, should the terms of the contract later be satisfied. More desirable is a highly tamper-resistant mechanism for reducing the function of the computer to a such an extent that a restoration process is the only practical operation to perform.

A security module may be used to manage BIOS images, power, and bus activity. The security module may have more than one BIOS for use depending on whether settings made prior to a current boot indicate normal, metered use or restricted operation, suitable only for re-activating the computer. If restricted operation is indicated, a restricted operation BIOS may be selected and loaded. The restricted operation BIOS sets system memory to a very limited amount, for example, 4 megabytes. The system memory may be set to any size that allows operation of a small system restoration application, but is too small to allow execution of an operating system, game or other beneficial user application. To help ensure that the selected BIOS has time to perform its system set up activities with minimized opportunity for interference, the security module may also manage power to non-essential circuits of the computer, such as an I/O chip. When a power button is pressed, essentially a request for power, the security module routes power to essential circuits until a signal from the BIOS, or a timeout period expires, before routing power to other circuits, such as a keyboard or mouse interface.

Packaging the security module and the system processor in an multi-chip module, or similar hybrid, helps ensure that the security module is not simply disabled by a "cut and jumper" attack on the power lines. In one embodiment, the system processor uses an architecture that integrates the traditional "Northbridge" functions of memory management. This allows an additional function of the security module to be implemented for monitoring bus activity. Especially when the processor uses a packet-oriented bus, such as a Hypertransport™ bus, the security module can monitor traffic to determine if non-authorized traffic is occurring and take an appropriate action, such as resetting the computer. The security module may also cause the bus the reset periodically, to enforce the reduced memory limit. In one embodiment, the bus monitor function of the security module may be capable of disabling individual lines on the bus, to enforce reduced memory size.

When the operation of the computer is designated for normal, metered use, the security module may supply the normal BIOS. During normal operation, the security module, using a built-in cryptographic function, may manage metering or subscriptions, including the processes associated with adding value, time, or subscriptions to the computer.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skills notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance with the present invention, further discussion of such software and ICs, if any, will be limited to the essentials with respect to the principles and concepts of the preferred embodiments.

Many prior-art high-value computers, personal digital assistants, organizers, and the like, are not suitable for use in a pre-pay or pay-for-use business model as is. The ability to enforce a contract requires a service provider, or other enforcement entity, to be able to affect a device's operation even though the device may not be connected to the service provider, e.g. connected to the Internet. A first stage of enforcement may include a simple pop up warning, indicating the terms of the contract are nearing a critical point. A second stage of enforcement, for example, after pay-per-use minutes have expired or a subscription period has lapsed, may be to present a system modal user interface for adding value and restoring service. A provider's ultimate leverage for enforcing the terms of a subscription or pay-as-you go agreement is to disable the device. Such a dramatic step may be appropriate when it appears that the user has made a deliberate attempt to subvert the metering or other security systems active in the device.

Uses for the ability to place an electronic device into a limited function mode may extend beyond subscription and pay-per-use applications. For example, techniques for capacity consumption could be used for licensing enforcement of an operating system or individual applications.

Figure 1:
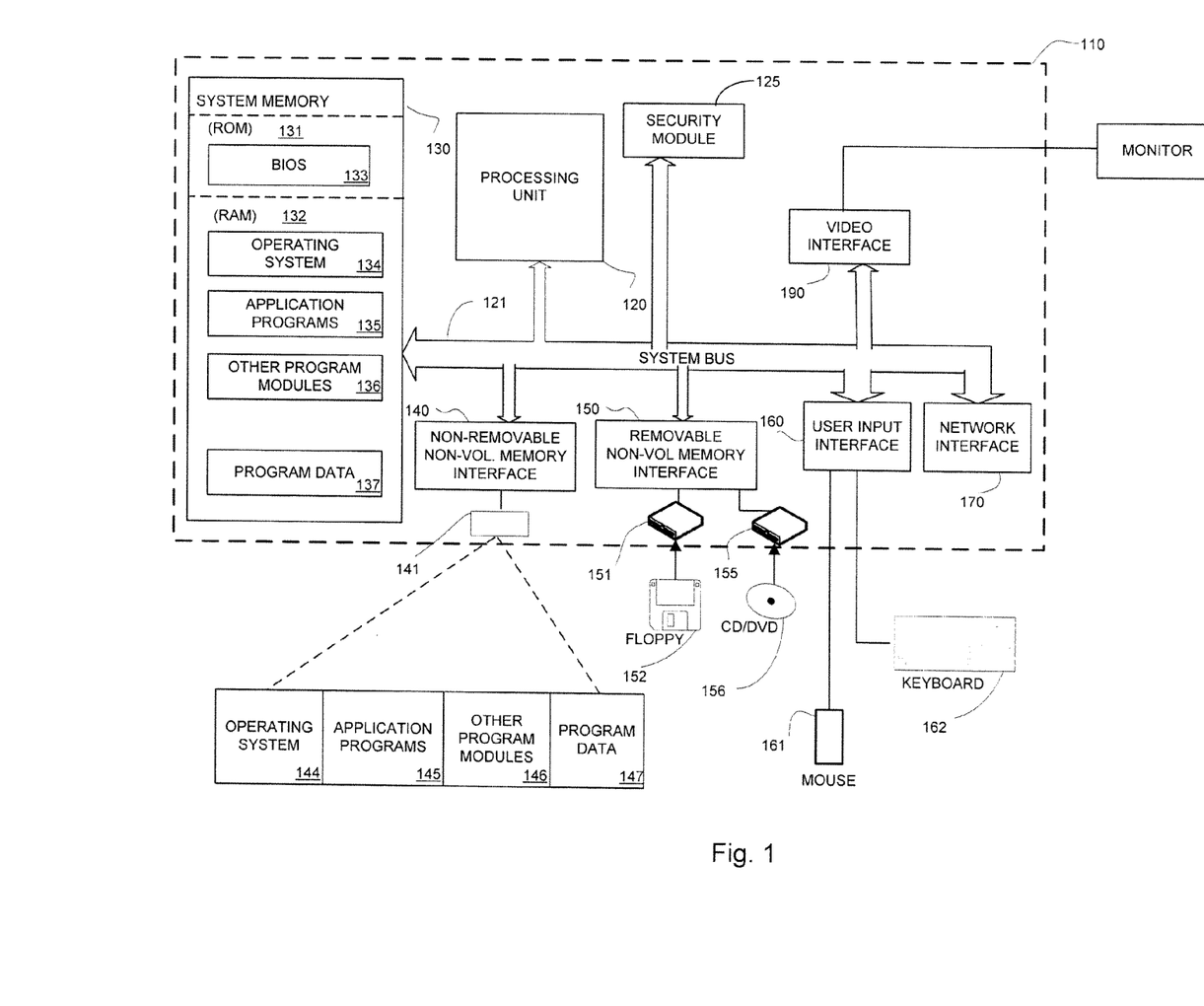
FIG. 1 is a block diagram of a logical view of a computer.

FIG. 1 illustrates a logical view of a computing device in the form of a computer 110 that may be used in a pay-per-use or subscription mode. For the sake of illustration, the computer 110 is used to illustrate the principles of the instant disclosure. However, such principles apply equally to other electronic devices, including, but not limited to, cellular telephones, personal digital assistants, media players, appliances, gaming systems, entertainment systems, set top boxes, automotive dashboard electronics, to name a few. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, front side bus, and Hypertransport™ bus, a variable width bus using a packet data protocol.

The computer 110 may include a security module 125 (SM). The SM 125 may be enabled to perform security monitoring, pay-per-use and subscription usage management, and policy enforcement related to terms and conditions associated with paid use, particularly in a subsidized purchase business model. The security module 125 may be embodied in the processing unit 120, as a standalone component, or a hybrid, as depicted in later figures.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 55 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, digital camera, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190.

The computer 110 may operate in a networked environment using logical connections to one or more remote computers (not depicted) over a network interface 170, such as broadband Ethernet connection or other known network.

Figure 2:
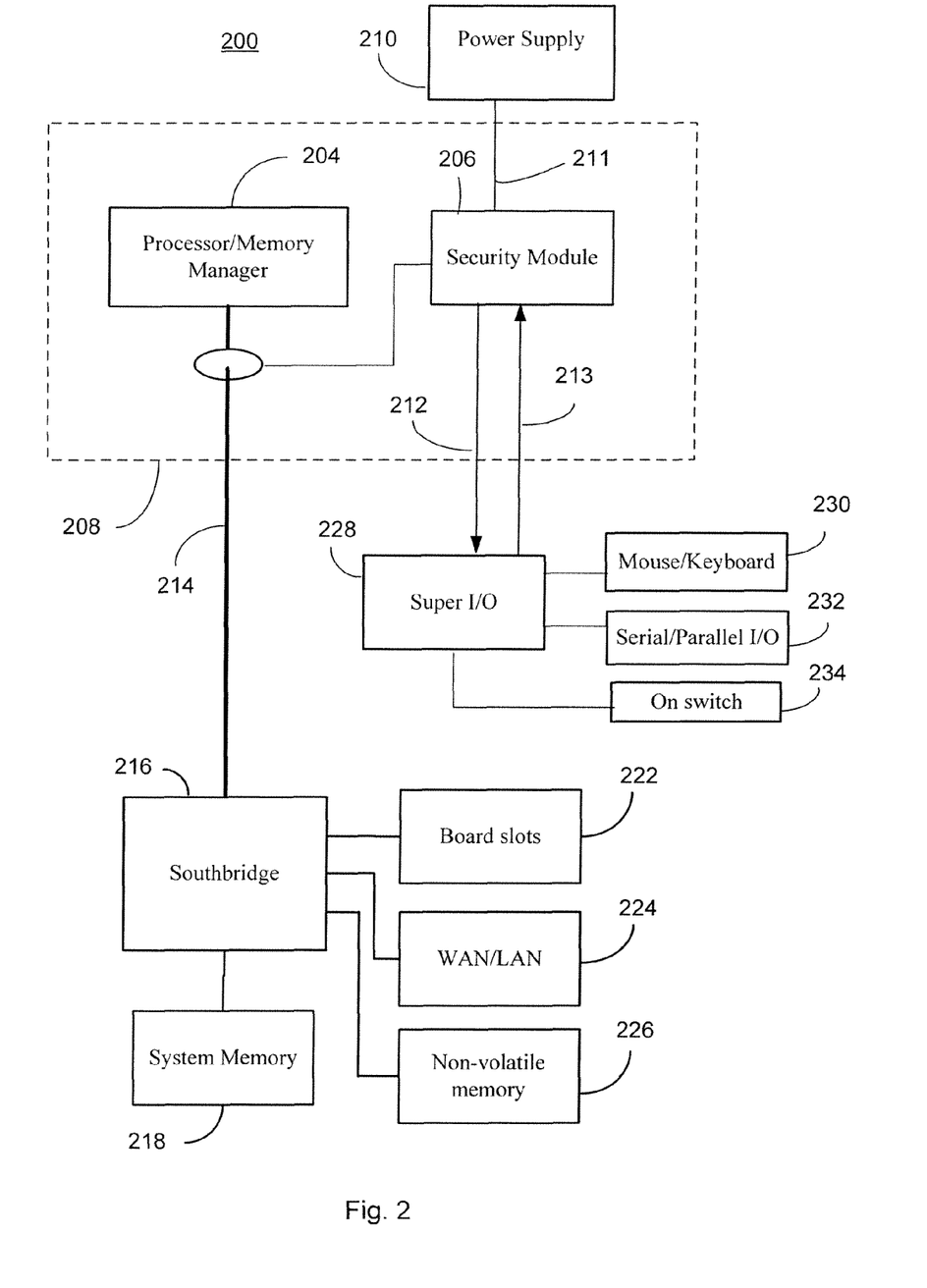
FIG. 2 is a block diagram of an architecture of a computer similar to the computer of FIG. 1.

FIG. 2 is an architectural diagram of a computer 200, the same as or similar to the computer of FIG. 1. The computer 200 may include a processor 204. The processor 204 may also include a memory manager, the so-called "Northbridge" function. Such processors are available from Advanced Micro Devices and others. A security module 206 may include secure memory, cryptographic functions, and other specialized functions. The security module is discussed in more detail below. The processor 204 and the security module 206 may be packaged into a first circuit 208 as a multi-chip module (MCM) or together on a daughterboard. Mechanical packaging of this sort may improve the overall security of the combination by making the combination more difficult to hack from a hardware perspective, for example, a trace "cut and jumper" attack or chip removal with "dead bug" replacements.

A power supply 210 may include a control output 211, also known as a "Power OK" used to signal that the power supply output is at voltage and stable. Such a signal is often used as an input in large or high value chips to protect them from low voltage or unstable power that may affect circuit performance or cause damage. The control output 211 may pass through the security module 206 via signal line 212 to hold off booting of non-first circuit 208 devices, as described below.

A data bus 214 may be a conventional bus arrangement with bi-directional data lines. The data bus 214 may also be a point-to-point unidirectional bus, such as a Hypertransport™ bus. Such a bus may support packet data, rather than the clocked data of a more conventional bus. To support bi-directional data, a data bus of this type may actually have a second, reverse path data connection. Point-to-point unidirectional busses may be daisy-chained to connect additional devices. In FIG. 2, the security module 206 is shown loosely coupled to the data bus 214, but may in fact be simply another device in the daisy chain.

An I/O controller, or Southbridge 216 may be used to connect to system memory 218 or peripheral devices such as board slots 222, wide-area or local-area network connections 224, or nonvolatile memory 226, for example, flash memory or a hard disk, such as hard disk 141 of FIG. 1. Another I/O controller, or Super I/O 228 may also be used to connect less data intensive or non-addressable devices such as a mouse/keyboard 230, serial and parallel I/O 232, and an "on" switch 234.

In operation, when the on switch 234 is depressed a signal is sent from the super I/O 228 in standby mode to the security module 206 using signal line 213, indicating a request to power the computer 200. The power supply 210 may be switched from standby to full power. The power supply 210 may signal the security module 206 using the control output 211 that full power is available and stable. However, the security module 206 may maintain a disabled state on the control output 212 to the super I/O 228, keeping the computer components outside of the first circuit 208 in reset. Many other methods of managing a start up sequence beyond manipulation of power OK signals may be used in this context. In one embodiment, actual power may be switched in the security module 206 to either the super I/O 228, or to other system critical components. In yet another embodiment, coded signals may be used to allow the security module to restrict operation of selected components outside the first circuit 208 until the security setup in the first circuit 208 is complete.

After the security module 206 and the processor 204 have power and begin the boot cycle, a BIOS may be supplied by the security module 206 to the processor for initial operation of the computer 200. The security module 206 may also use its connection to the data bus 214 to block data traffic during the initial boot phase, primarily to make it more difficult for a hacker to access the processor when the BIOS is loading and starting. The BIOS supplied to the processor 204 may be a function of data stored in the security module 206 indicating whether the computer 200 should boot in an operating mode or a reduced function mode. The processor 204 will configure the data bus 214 in accordance with instructions in the selected BIOS, that is, full memory access for the operating mode or limited memory access for the reduced function mode. Part of the startup of the BIOS may be to read a register in the security module 206 to verify the state (operating or restricted) of the computer 200. If the wrong BIOS is loaded, that is, a full operation BIOS, when the register is set to restricted, the full operation BIOS may simply stop. This will help thwart a BIOS substitution attack, that is when one BIOS in the security module 206 is used in the place of the other.

When the BIOS has reached a point where the data bus is configured and any initial programs are stable, the security module may unblock the data bus 214 and supply the power OK signal on the control output 212. When the security module 206 keeps the data bus 214 blocked until signaled by the BIOS, a potential BIOS replacement attack (using a new, outside BIOS) is impeded, because the BIOS-to-security module 206 protocol for unblocking the data bus 214 will have to be reverse engineered before the replacement BIOS is able to unblock the data bus. When the power OK signal is detected at the super I/O chip 228, the rest of the super I/O chip is enabled and the remainder of the computer 200 is able to come up to an operational state.

The BIOS sets the state of the computer 200, notably, the amount of system memory 218 available to the processor 204. In most cases, the BIOS may perform an inquiry as to the size of the memory and set the memory limits accordingly. However, in the case of restricted operation, the BIOS may simply set the memory to a given size, despite the availability of more memory. In one embodiment, the memory size is set to accommodate a BIOS routine that handles user input for interaction with the security module to restore an operational status. In another embodiment, the memory size is set to 4 megabytes. This is less than 1% of the 1 gigabyte system memory common in current systems and well less than the amount required to load and run any current operating system, game, or office application.

The security module 206 may use its access to the data bus 214 for several purposes after boot. The security module 206 may simply monitor the data bus to see that the correct address range is being used. If addresses fall out of the valid range, the security module 206 can pull the power OK line 212 and the computer 200 will reset. The security module 206 may also monitor actual traffic on the data bus 214, analyzing instructions and data values either already identified as belonging to a known attack (an attack fingerprint) or simply involving unexpected instructions and data values. Again, the result of known or suspected bad behavior may be a system reset. Monitoring in this fashion is simplified when the data bus 214 is a packet-oriented data bus routed through the security module 206, but conventional data and address bus operations can be similarly monitored. To block the data bus 214, as during start up, the security module 214 may either not retransmit data on a point-to-point daisy chain data bus, or may load the data lines of a conventional bus to the point the data is unreadable.

During restricted operation, a minimal application may run from the restricted operation BIOS. Keyboard input and only low resolution graphics may be supported, allowing a user or customer service person to enter a code to add value or restore subscription status to the computer 200. When the code has been entered and verified, the security module 206 may re-value the appropriate counters associated with normal, metered operation. The security module 206 may also reset the boot flag for restricted operation so that the next boot cycle will result in normal, metered operation. The security module 206 may automatically reset the system after the flag has been so set.

Figure 3:
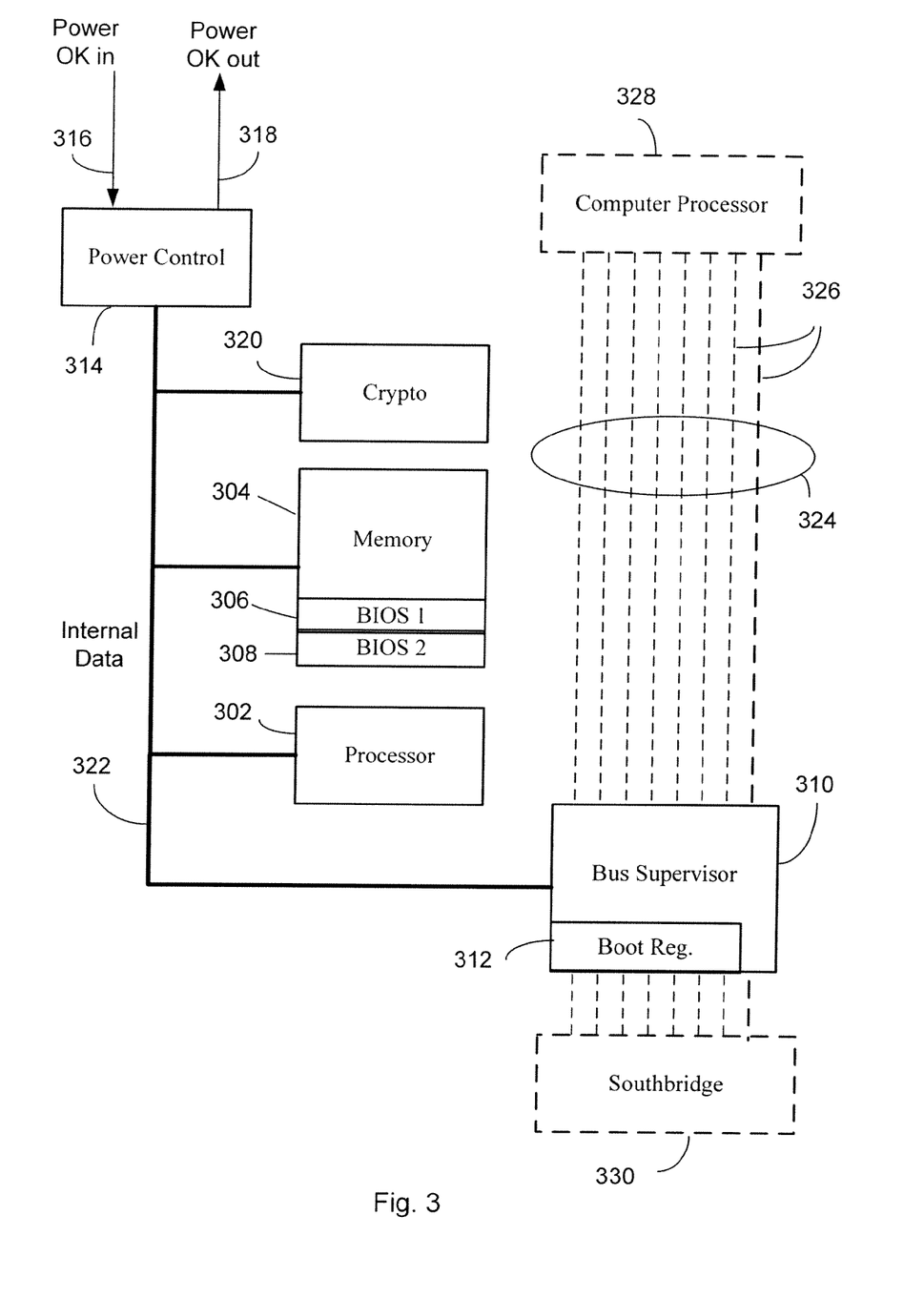
FIG. 3 is a simplified and representative block diagram of a security module.

FIG. 3 is a simplified and representative block diagram of a security module 300. The security module 300 may include a processor 302 and a memory 304 including a first BIOS 306 and a second BIOS 308. The memory 304 may include both volatile and non-volatile memory. At least the portion of memory storing the first and second BIOS 306 308 is preferably secure memory and requires cryptographic authentication before it may be altered. Another portion of the memory 304 may be used as scratchpad by the processor 302. The processor may be an ARM® Core processor or a single chip controller from companies such as Intel, SST, or Freescale.

A bus supervisor 310 may include a register 312 for storing a boot flag, described above. A power control circuit 314 may include a power OK input 316 and a power OK output 318. The power OK input 316 may be used to manage internal power of security module devices and also as a signal that the power OK output 318 may be set after authorization from the processor 302. The power OK signal processing may be accomplished using a standalone circuit in the security module 300, or may be implemented in software using either analog or digital inputs on the processor 302, depending on convenience and I/O availability. A cryptographic module 320 may be used to manage metering/subscription data as well as to qualify value-add and restoration processes. The cryptographic module 320 may be a smart chip, such as an Infineon SLE66, or may be implemented in software in the processor.

The bus supervisor 310 may be coupled to a data bus 324 having individual data lines 326 and may be the connection between a computer processor 328 and a memory interface circuit, such as Southbridge 330. As discussed above, the bus supervisor 310 may serve either to monitor traffic on the bus 324, block the entire bus 324, block individual data lines, or all, depending on the implementation. Because the bus supervisor 310 is a full data bus participant, the facilities of the security module 300 may be made available to the processor 328. For example, while booting, the bus supervisor 310 may be used to supply the selected BIOS to the computer processor 328. When in restricted operation mode, the bus supervisor 310, under the control of the processor 302, can run a configuration cycle on the data bus to ensure that the bus is set to the limited memory size, for example, 4 megabytes. Also, because the processor 302 can communicate with the Southbridge 330 and the computer processor 328, the processor can query the system to determine the size of the configured memory. As above, if the size of the configured memory does not match the expected size of the configured memory, the processor can cause a system reset. Even if the security module 300 cannot prevent unauthorized use, the security module 300 has several resources at its disposal for making the unauthorized use less productive.

The security module 300 may be a multi-chip module (MCM) and may take advantage of buried signal lines, power planes, and mechanical mounting techniques to help limit hardware attacks by limiting access to critical signal paths, such as a computer processor reset line (not depicted), that may be used in conjunction with the power OK line to cause a reset. Future integration capabilities will certainly allow the circuits and functions described here as separate or in an MCM to be integrated into a single circuit. It can be expected that at some fairly near point, all these functions would be available on a single chip along with the computer processor 328.

The power control circuit 314 may be in two-way communication with the processor 302, both alerting the processor 302 when the power OK input 316 is active (usually high) and when to transition the power OK output 318 to active. When the processor 302 determines a system reset is appropriate, it can transition the power OK output 318 to inactive, thereby causing a reset. To help prevent a cut and jumper attack on the power OK output 318, the processor 302 may also cause the computer processor 328 to reset, using a signal connection local to the MCM (not depicted) and not easily accessible without damage to surrounding components.

Figure 4:
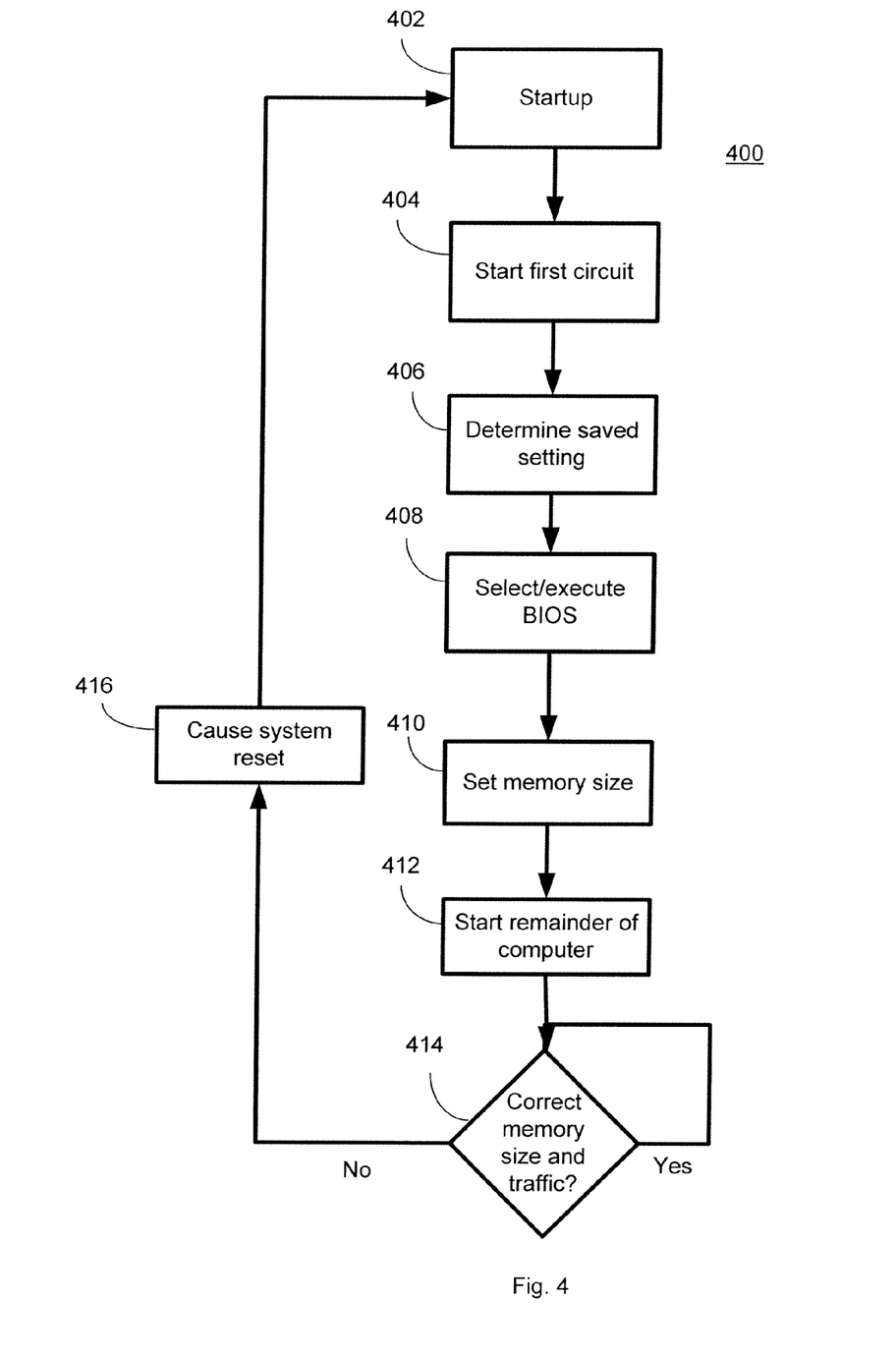
FIG. 4 is flow chart depicting an exemplary method of enforcing a limited function mode of operation in a computer.

FIG. 4 is a flow chart depicting an exemplary method 400 of enforcing a limited function mode of operation in a computer 200. At startup block 402, a computer 200 may begin a reset cycle. A power supply 210 may transition a power OK signal 211 indicating that the power supply 210 is stable. At block 404, a sensor in a first circuit 208 may read the power OK signal 211 and began a start up process for the first circuit 208, that may include a processor 204 and a security module 206. At block 406, a setting saved prior to the current boot cycle may be read to determine whether the computer 200 should be operated in a full use, metered mode, or should be operated in a restricted mode, indicative of a low value for prepaid usage time or an expired subscription. The selected BIOS may be loaded at block 408 and executed. As part of the startup process, at block 410, the BIOS will set the amount of memory available to the processor 204. At block 412, when the security module 206 has determined that the selected BIOS has completed the memory allocation, a power OK signal 212, or system power, may be enabled for remaining portions of the computer 200. At block 414, a bus supervisor component of the security module 206 may monitor traffic over a data bus 214, periodically check that available memory matches a setting appropriate to the selected BIOS, or both. When traffic and memory size meet appropriate criteria the yes branch from block 414 may be taken and the verification process repeated on a periodic basis. One, at block 414, either traffic or memory size do not meet appropriate criteria, the no branch from block 414 may be taken to block 416. At block 41 6, the security module 206 may cause a system reset which will return operation to block 402.

The ability to select a BIOS based on a previous setting and allowing a security module to monitor configuration of the data bus managing processor-to-memory traffic provides an effective tool set for managing a paper use or subscription computer, or other electronic device. The system of checks and balances including the BIOS checking a boot flag, the security module checking system configuration, and the security module using a bus monitor to fingerprint processor traffic creates a previously unavailable level of security for managing a remote asset. The ability to disable a remote computer when the terms of a pay-per-use or subscription purchase are not honored allows system and service providers a powerful tool for protecting their assets. At the same time, the security module is the only addition to a system otherwise populated with off-the-shelf, industry available, components.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A module disposed in a metered-use computer for enforcing operation of the metered-use computer in a restricted use mode, the module comprising:
   a processor;
   a memory coupled to the processor storing executable code and settings;
   a bus supervisor coupled to the processor and attached to a system bus coupling a computer processor and a computer memory, the bus supervisor operable to enable traffic on the system bus responsive to a first signal from the processor, wherein the bus supervisor is further operable to monitor traffic on the system bus for unauthorized data traffic during restricted use operation;
   a cryptographic function available to the processor; and
   a power control circuit that delays starting a portion of the metered-use computer responsive to a second signal from the processor.

2. The module of claim 1, wherein the cryptographic function is a smart chip.

3. The module of claim 1, wherein the cryptographic function is software executing on the processor.

4. The module of claim 1, wherein the system bus is a packet-oriented high speed data bus.

5. The module of claim 1, wherein the bus supervisor comprises a boot mode register.

6. The module of claim 1, wherein the bus supervisor default behavior is to disable traffic on the system bus until receipt of the first signal.

7. The module of claim 1, wherein the processor periodically resets the system bus to restricted memory size during restricted use operation.

8. A method of operating a computer in a restricted mode comprising:
   starting a boot cycle in the computer;
   powering a first circuit that controls a power signal for an interface device;
   selecting a BIOS from a set of BIOSs stored at the first circuit, according to a setting saved prior to the boot cycle;
   executing the selected BIOS;
   enabling a bus switch responsive to a signal generated by the selected BIOS to allow traffic on a set of data paths associated with a system bus after the BIOS operation is stable;
   verifying a status of the selected BIOS at the first circuit; and
   sending a power signal to the interface device.

9. The method of claim 8, further comprising verifying the memory available to a processor of the computer.

10. The method of claim 8, further comprising executing a restricted mode application of the BIOS when the setting saved prior to the current boot cycle is indicative of restricted operation.

11. The method of claim 10, wherein executing the restricted mode application at the BIOS when the setting saved prior to the current boot cycle is indicative of restricted operation comprises executing the restricted mode application to display a prompt and enable user input to enter an unlock code when the setting saved prior to the current boot cycle is indicative of restricted operation.

12. The method of claim 8, wherein the first circuit comprises the processor of the computer, a local processor, and the bus switch.

13. The method of claim 8, wherein enabling a bus switch responsive to a signal comprises enabling the bus switch to allow traffic on a full set of the data paths allowing access to a full system memory when using an unrestricted BIOS and enabling the bus switch to allow traffic on a limited set of data paths allowing access to less than one percent of the full system memory when using a restricted operation BIOS.

14. A computer adapted for metered operation having a metered mode and a restricted mode of operation comprising:
   a processor;
   a system memory;
   a set of data lines forming a bus coupling the processor to the system memory;
   a set of intermediary circuits coupling the processor to system devices and peripherals; and
   a security module having a data connection to the processor and power management connections to the set of intermediary circuits, the security module comprising:
      a specialized processor;
      a local memory comprising executable code for a first BIOS used to boot the computer in the metered mode and a second BIOS used to boot the computer in the restricted mode; and
      a bus monitor adapted to selectively disable the bus and further adapted to monitor data traffic on the bus for unauthorized instruction usage.

15. The computer of claim 14, further comprising a power activation switch coupled to the security module and the security module further comprising a power manager responsive to a signal from the power activation switch for authorizing power to at least the security module and the processor before authorizing power to the set of intermediary circuits.

16. The computer of claim 14, wherein the security module further comprises a cryptographic function.

17. The computer of claim 16, wherein the cryptographic function is one of a smart chip and an executable code implementing a cryptographic function.

18. The computer of claim 14, wherein the local memory further comprises executable code as a part of the second BIOS that, when executed, causes the bus monitor to disable individual data lines of the set of data lines.

* * * * *

UNITED STATES PATENT AND TRADEMARK OFFICE
CERTIFICATE OF CORRECTION

| | |
|---|---|
| PATENT NO. | : 7,844,808 B2 |
| APPLICATION NO. | : 11/612435 |
| DATED | : November 30, 2010 |
| INVENTOR(S) | : William J. Westerinen et al. |

It is certified that error appears in the above-identified patent and that said Letters Patent is hereby corrected as shown below:

Delete Drawing Sheet 3 of 4, and substitute the attached drawing sheet.

Signed and Sealed this
Fourteenth Day of February, 2012

David J. Kappos
*Director of the United States Patent and Trademark Office*

Fig. 3